Oct. 4, 1960

A. PEARSON 2,955,207

RADIATION DETECTOR

Filed Nov. 25, 1955

INVENTOR
ALBERT PEARSON
BY Smart & Biggar
ATTORNEYS

United States Patent Office 2,955,207
Patented Oct. 4, 1960

2,955,207

RADIATION DETECTOR

Albert Pearson, Deep River, Ontario, Canada, assignor to Atomic Energy of Canada Limited, Ottawa, Ontario, Canada, a company of Canada Filed Nov. 25, 1955, Ser. No. 548,807

2 Claims. (Cl. 250—83.6)

The invention relates to a radiation detector of the type using a halogen-quenched Geiger-Muller tube and a cold-cathode trigger tube.

Prior to the invention, this type of detector of radiation has had a relatively limited range of indication of count rate because of the limitations imposed by the speed of response of the cold-cathode trigger tube. The present invention provides a radiation detector having greatly increased range of indication by combining the mean current from the Geiger-Muller tube with the mean current from the cold-cathode trigger tube.

A radiation detector according to the invention comprises a halogen-quenched Geiger-Muller tube connected to control a cold-cathode trigger tube. A capacitor is connected from the anode to the cathode of the trigger tube and upon the Geiger-Muller tube causing the trigger tube to fire, the capacitor is discharged and can then recharge. The connections of the cathodes of the Geiger-Muller tube and of the trigger tube are arranged so that the current to the Geiger-Muller tube and the current for recharging the capacitor flows through a common indicator circuit. Thus the indication provided corresponds to the sum of the current through the Geiger-Muller tube and the current for recharging the capacitor. In this way an overall logarithmic characteristic is obtained with a greatly increased range of count indication.

Figure 1:
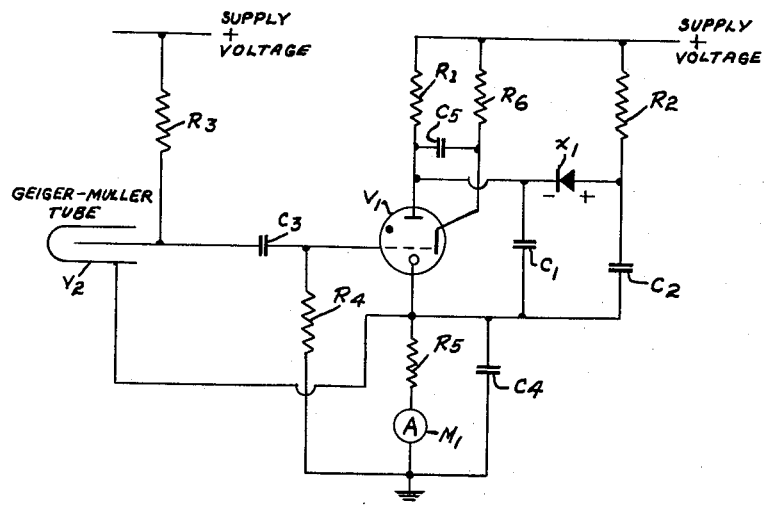
Figure 2:
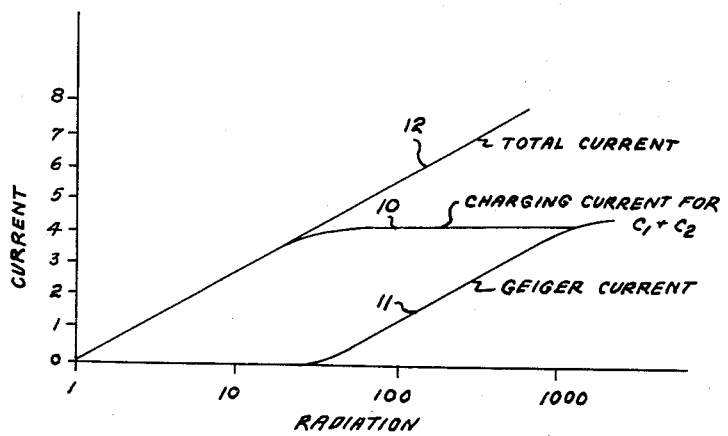

The invention will be further described with reference to the accompanying drawing in which:

Figure 1 shows a schematic circuit diagram of a radiation detector according to the invention, and Figure 2 shows a graph used in explaining the operation of the circuit shown in Figure 1.

As shown in Figure 1, the anode wire of a halogen-quenched Geiger-Muller tube $V_2$ is connected through a capacitor $C_3$ to the control electrode of a cold-cathode gas discharge trigger tube $V_1$. The cathode of the Geiger-Muller tube $V_2$ is connected to the cathode of the trigger tube $V_1$, and the common connection so formed is connected through a resistor $R_5$ and a series connected ammeter $M_1$ to ground. A capacitor $C_1$ is connected from the anode to the cathode of the trigger tube $V_1$, and a second capacitor $C_2$ is connected in parallel with the capacitor $C_1$ through a rectifier $X_1$.

The positive side of the voltage supply for the Geiger-Muller tube $V_2$ is connected to the anode through a resistor $R_3$, and in the case of the trigger tube $V_1$ the positive side of the voltage supply is connected through a resistor $R_1$. The tube $V_1$ is supplied with a starting electrode which is connected to the positive supply voltage through a resistor $R_6$. A charging circuit for the capacitor $C_2$ is provided by the resistor $R_2$ connected to the positive supply voltage.

The following table provides an example of the value of the components shown in the drawing:

$R_1$ ......... 2.2 megohms.
$R_2$ ......... 8.2 megohms.
$R_3$ ......... 2.2 megohms.
$R_4$ ......... 10 megohms.
$R_5$ ......... 100,000 ohms.
$R_6$ ......... 100 megohms.
$C_1$ ......... 500 micromicrofarads.
$C_2$ ......... 2000 micromicrofarads.
$C_3$ ......... 10 micromicrofarads.
$C_4$ ......... 30 microfarads.
$C_5$ ......... 100 micromicrofarads.
$V_1$ ......... Cold-cathode trigger tube type VX 8086.
$M_1$ ......... 0–50 microamperes meter.

During use of the detector the Geiger-Muller tube $V_2$ causes the cold-cathode trigger tube $V_1$ to fire and discharge the capacitor $C_1$ and $C_2$ which then recharge. This charging current flows through the resistor $R_5$ and the ammeter $M_1$ and varies with radiation intensity as shown by the curve 10 in Figure 2. At a definite counting rate the circuit charging current for the capacitors $C_1$ and $C_2$ reaches a constant value for increasing radiation intensity as shown by the flat part of the curve 10. At this point the mean current from the Geiger-Muller tube $V_2$ begins to become appreciable, as shown by the curve 11 in Figure 2, and flows to ground through the resistor $R_5$ and the ammeter $M_1$, adding to the current already there. With increasing radiation intensity this extra current from the Geiger-Muller tube $V_2$ increases in a quasi-logarithmic manner and produces together with the mean current from the cold-cathode trigger tube $V_1$ an over-all logarithmic characteristic as shown by the curve 12 in Figure 2. In this way the range of indication of the radiation detector is greatly increased.

What I claim as my invention is:

1. A radiation detector for converting radiation into electrical impulses comprising a halogen-quenched Geiger-Muller tube having a cathode and an anode, a cold-cathode trigger tube having a cathode, an anode and a control electrode; a connection from the anode of the Geiger-Muller tube for supplying electrical impulses therefrom to said control electrode; a capacitor connected from the anode to the cathode of the trigger tube; a rectifier, a second capacitor connected from the cathode of the trigger tube to supply current through said rectifier to the anode of the trigger tube, a connection for charging said second capacitor with a direct current voltage; a direct current connection from the cathode of the Geiger-Muller tube to the cathode of the trigger tube; connections for supplying positive direct current voltages to the anode of the Geiger-Muller tube and to the anode of the trigger tube with a voltage supply return connection from the cathode of the trigger tube; and means in the return connection for indicating the current flow therein.

2. A radiation detector as claimed in claim 1 in which the means for indicating the current flow in the return connection is a series connected resistor and direct current ammeter.

References Cited in the file of this patent

UNITED STATES PATENTS

| | | |
|---|---|---|
| 2,549,058 | Constable | Apr. 17, 1951 |
| 2,582,367 | Williams et al. | Jan. 15, 1952 |
| 2,692,339 | Franklin | Oct. 19, 1954 |
| 2,756,347 | White | July 24, 1956 |